(12) United States Patent
Ferrante

(10) Patent No.: US 6,444,308 B1
(45) Date of Patent: Sep. 3, 2002

(54) MICROWAVE BOOKBINDER TAPE

(75) Inventor: John L. Ferrante, Williamson, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/467,422

(22) Filed: Dec. 20, 1999

Related U.S. Application Data

(63) Continuation-in-part of application No. 08/885,205, filed on Jun. 30, 1997, now abandoned.

(51) Int. Cl.[7] .................................................. B32B 3/26
(52) U.S. Cl. ................ 428/349; 428/354; 428/355 AC
(58) Field of Search ................................ 428/349, 354, 428/355 AC

(56) References Cited

U.S. PATENT DOCUMENTS 4,267,420 A    5/1981  Brastad ...................... 219/730
5,006,396 A  * 4/1991  VanBortel et al. .......... 428/189

* cited by examiner

*Primary Examiner*—Blaine Copenheaver
*Assistant Examiner*—Hai Vo
(74) *Attorney, Agent, or Firm*—Wayne J. Egan

(57) ABSTRACT

A microwave binder is used in conjunction with paper tape which is coated with one or more formulations of encapsulated, fast setting, water soluble adhesives to bind pages of a book. The tape spine adhesive is of sufficient thickness to allow it to penetrate into the edges of the pages of the bound edge. The microwave heating causes the capsules to rupture, releasing the adhesives to flow into the bound edge of the book.

2 Claims, 3 Drawing Sheets

US 6,444,308 B1

MICROWAVE BOOKBINDER TAPE

CROSS-REFERENCE TO RELATED APPLICATIONS

This is a continuation-in-part of commonly-assigned prior application Ser. No. 08/885,205 filed Jun. 30, 1997 by now abandoned John L. Ferrante et al., entitled "Microwave bookbinder tape," now abandoned, the disclosure of which prior application is hereby incorporated by reference.

INCORPORATION BY REFERENCE OF U.S. PATENT

The applicant hereby incorporates by reference the disclosure of U.S. Pat. No. 4,267,420, William A. Brastad, "Packaged food item and method for achieving microwave browning thereof," issued May 12, 1981.

FIELD OF THE INVENTION

This invention relates to bookbinding, and more particularly, to a tape employed in a microwave bookbinding system.

BACKGROUND OF THE INVENTION

Typical current Bookbinding systems include equipment that utilizes heated surfaces which comes into contact with a tape substrate coated with a hot-melt adhesive, as shown for example, in U.S. Pat. No. 3,928,119 where an adhesive bearing strip is driven, by relative motion between a stack of sheets and spaced platens, between the heated platens by the stack. In machines of this type, the heated platens are subsequently moved toward each other to move and press the adhesive strip to the stack of sheets. A moisture proof binding tape for edge binding pages to form a book is shown in U.S. Pat. No. 5,213,871 that consisting of a non-permeable temperature resistant foil layer covering one side of the backing strip forming a moisture barrier, a high temperature steam resistance adhesive between the foil layer and the backing strip to secure the foil layer to the backing strip, and a relatively thick central stripe of high tack heat activated adhesive flanked by relatively thin side stripes of low tack heat activated adhesive on the foil layer, the central adhesive stripe comprising a non-hygroscopic adhesive. Some disadvantages of systems of this type include: the high energy consumption (i.e., maintained at a specific temperature, for example, about 400° F.); the relatively long dwell time to fluidize the adhesive; and the difficulty in recycling bound books. The above-mentioned patents are incorporated herein by reference to the extent necessary to practice the present invention.

Thus, there is still a clear need for an improved bookbinding system that has a lower binding time, is cheaper in cost per bind, and is more energy efficient.

SUMMARY OF THE INVENTION

In one aspect of the invention, a tape is disclosed that includes a water soluble adhesive that surrounds the spine portion of a book to be bound a microwave bookbinding system. Upon activation of a microwave heater, the adhesive reacts to microwave energy to penetrate into edges of pages of the book to bind them together in the book.

In another aspect of the invention, a binder tape is disclosed that comprises a thin dielectric film which converts microwave energy into thermal energy, thus causing a layer of glue to melt and promote the binding of the page edges and flaps of books around which the binder tape is mechanically wrapped.

BRIEF DESCRIPTION OF THE DRAWING

All of the above-mentioned features and other advantages will be apparent from the example of one specific apparatus and its operation described hereinbelow. The invention will be better understood by reference to the following description of this one specific embodiment thereof, which includes the following drawing figures (approximately to scale) wherein.

DESCRIPTION OF THE PREFERRED EMBODIMENTS

The invention will now be described by reference to a preferred embodiment of the microwave bookbinding system of the present invention preferably for use in a conventional copier/printer. However, it should be understood that the bookbinding system of the present invention could be used with a stand alone apparatus or with any machine environment in which binding of sheets is desired.

Figure 1:
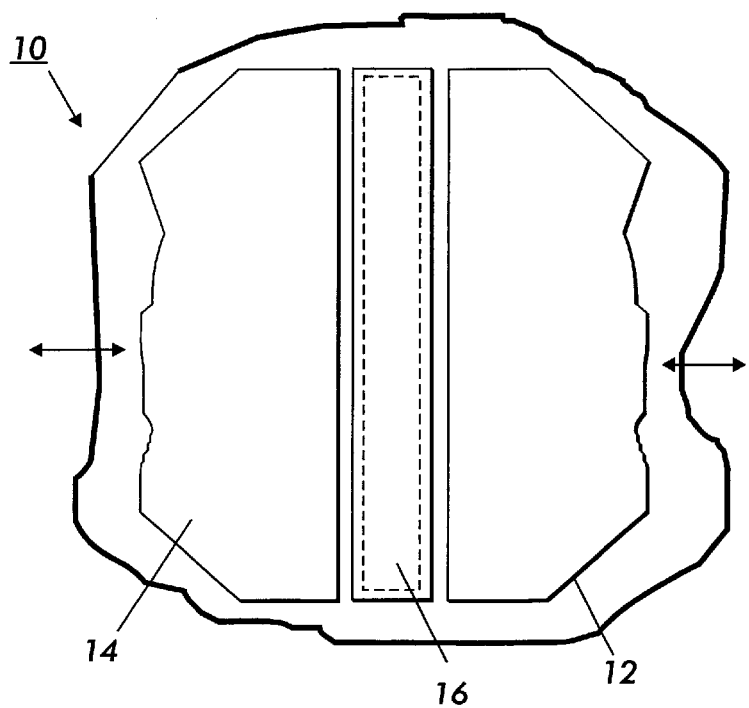
FIG. 1 is a schematic top view of a microwave binder.
Figure 2:
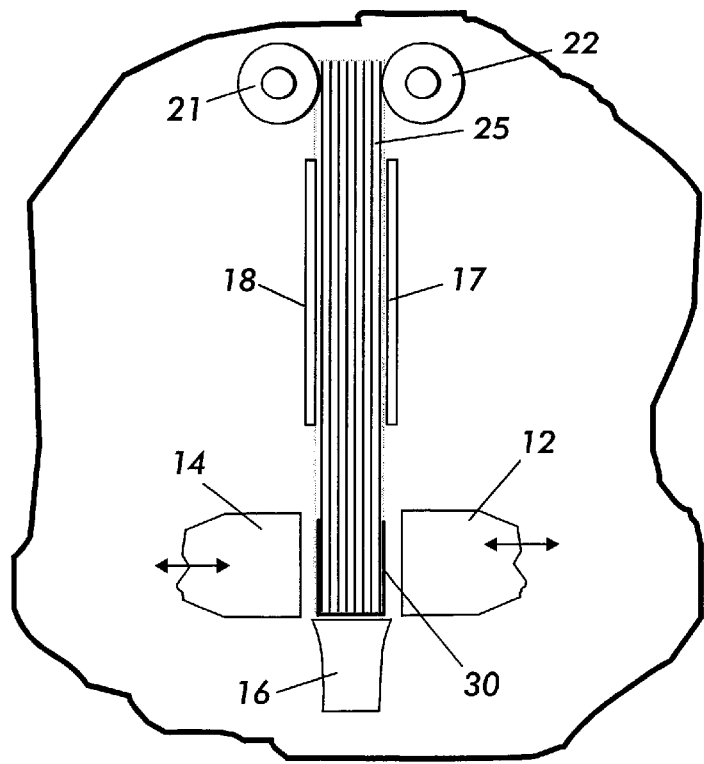
FIG. 2 is a schematic end view of the binder apparatus of FIG. 1 incorporating the tape of the present invention.

For a general understanding of the features of the present invention, reference is made to the drawings. In the drawings like reference numerals have been used throughout to designate identical elements. FIGS. 1 and 2 schematically depict the bookbinding method and apparatus of the present invention.

Describing in further detail, the exemplary microwave apparatus 10 comprises flap heater/pressure jaws 12 and 14 positioned to heat the sides of a tape 30 shown in FIG. 2, while spine heater 16 is positioned to heat that portion of tape 30 that is covering the spine of book 25. Book guides 17 and 18 maintain book 25 in a predetermined position within microwave apparatus 10. Rollers 21 and 22 are used to feed book 25 into position to receive tape 30 along the spine and adjacent sides of the book. The process of binding books with this system is potentially safer and more energy efficient than thermal binding. Rollers could be used instead of jaws 12 and 14 to perform the pressing function, if desired.

In use, a book 25 is fed between guides 17 and 18 by feed rollers 21 and 22 until the spine of the book approximates a horizontal plane along the lower edge of flap/pressure jaws 12 and 14 and comes to rest against binder tape 30. Binder tape 30 has a portion thereof forced upward on either sides of book 25. Flap heater/pressure jaws 12 and 14 and spine heater 16 are then moved into contact with tape 30 while microwave heater 10 is simultaneously activated to apply microwave energy to the heaters. With binder tape 30 being made of paper and coated with one or more formulations of encapsulated, fast setting, water based adhesives, the microwave heating will allow the capsules to rupture, releasing the adhesive to penetrate into the edges of pages on the book on the bound edge. References to water based adhesives are intended to cover the general category of thermal cast acrylic adhesives such as, for example, Flexback 341077 available from National Starch, and UNIREZ2616 available from Arizona Chemical. The use of microwaves to bind books has been proven by taking a hot-melt adhesive from a conventional Xerox™ 5090 binder tape that includes a vinyl acetate (EVA) flap adhesive and poly amide spine adhesive that is mounted on a latex saturated sheet of paper. These adhesives can be obtained from National Starch, 4079 Senator Street, Memphis, Tenn. 38118, and from Arizona Chemical, Inc., 411 S. Pace Blvd., Pensacola, Fla. 32501. This laminate was then placed on an unbound book and the book then placed in a CEM Corporation AVC80 solid generator microwave oven at 630 watts for 2 minutes. An 11 inch clip was used to hold the binder tape composite on the book during the oven exposure.

Figure 3:
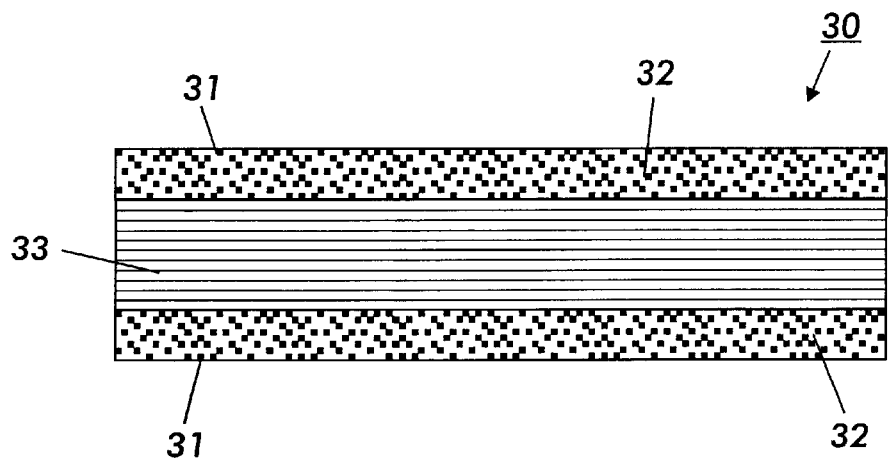
FIG. 3 is an enlarged, schematic top view of the binder tape of the present invention used with the binder of FIG. 1.

Referring to FIG. 3 of the drawings and the present invention, numeral 30 designates generally a binding tape of the type used to adhesively bind pages together to form a book, In the example shown, tape 30 comprises a length or strip 31 of formable backing or substrate material consisting of relatively heavy paper stock bearing microwave energy activated adhesive coatings. Typically, tape 30 is in the form of a roll (not shown) that is cut to desired length at the time of use. Normally, the length to which tape 30 is cut when binding is substantially equal to the length of the pages of book 25 being bound, although other lengths may be contemplated. The width of the backing strip 31 is somewhat greater than thickness of book 25 to allow the sides or flaps of tape 30 to partially wrap around and be secured to the other pages or covers of the assembled book 25. Backing strip 31 may be of any desired thickness.

Turning now more specifically to tape 30, it is shown in FIG. 3 as including a relatively thin ethylene vinyl acetate flap adhesive 32 of about 6 mils thick and a relatively thick poly amide spine adhesive 33 of about 19 mils thickness. The spine adhesive must be of sufficient thickness to allow it to penetrate into edges of the pages on the bound edge of the book. The adhesives are mounted on a paper base. In one embodiment, adhesive 32 comprises an EVA resin such as, for example, Flexback 341077 available from National Starch, and adhesive 33 comprises a polyamide resin such as, for example, UNIREZ2616 available from Arizona Chemical.

Figure 4:
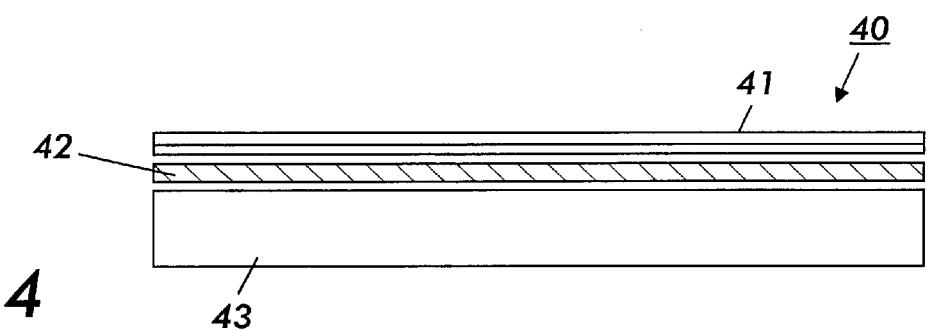
FIG. 4 is a schematic side view of an alternative three-part binder tape.

An alternative three-part tape 40 is shown in FIG. 4 that includes a latex saturated base paper 43 onto which is positioned an aluminized coating 42. A hot-melt, encapsulated, water-based glue 41 is placed on top of the aluminized coating. The aluminized coating may be printed or vaporized on the base paper or be on a separate carrier sheet which would be laminated to the base sheet prior to the addition of the adhesive. The aluminized coating converts the microwave energy into heat and distributes the heat evenly to the spine and flap adhesives producing a more consistent bind quality. It should be understood that other metalized coatings, such as zinc, which will generate heat when hit with microwaves can be used with excellent results. In one embodiment, the water-based glue 41 comprises the adhesive 32 of FIG. 3, the adhesive 33 of FIG. 3, or both.

Figure 5:
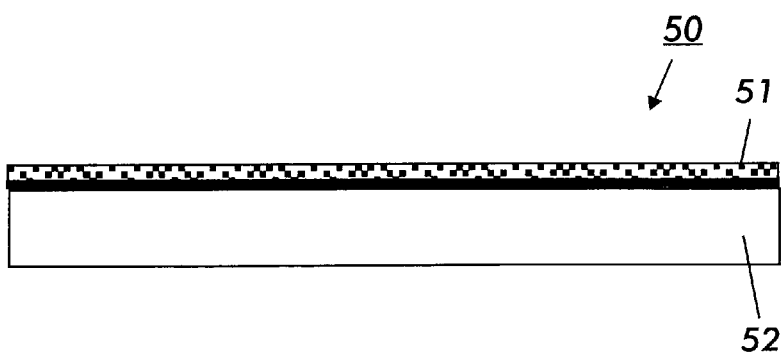
FIG. 5 is a schematic side view of yet another alternative two-part binder tape.

Another embodiment of a tape that is used effectively with the system of the present invention is shown in FIG. 5 that comprises a two-part laminate tape 50 in the form of a latex saturated base paper 52 with a hot-melt glue 51 with aluminum particles dispersed therein. The aluminum particles will allow for the even distribution of heat and a very short microwave binder cycle time. If desired, tape 50 can be used in the binding system without the dispersed aluminum. In addition, it should be understood that any metalized particles, such as, zinc could be used in the present invention as long as they will generate heat when subjected to microwaves. In one embodiment, the hot-melt glue 51 comprises the adhesive 32 of FIG. 3, the adhesive 33 of FIG. 3, or both.

It should now be apparent that a method and apparatus that makes binding books easier and more cost effective has been shown and includes the use of a paper tape coated with an encapsulated water based adhesive positioned around the spin of pages of a book with this combination inserted into a microwave apparatus. Energy from the microwave melts the adhesive causing it to flow into the pages of the book to bind them to each other. Advantages of this system over thermal binding systems include: heat energy being required only during the binding period; microwave heating of the adhesive requires much shorter dwell time during the binding sequence; and with the adhesive being water based, recycling of bound books is possible.

Figure 6:
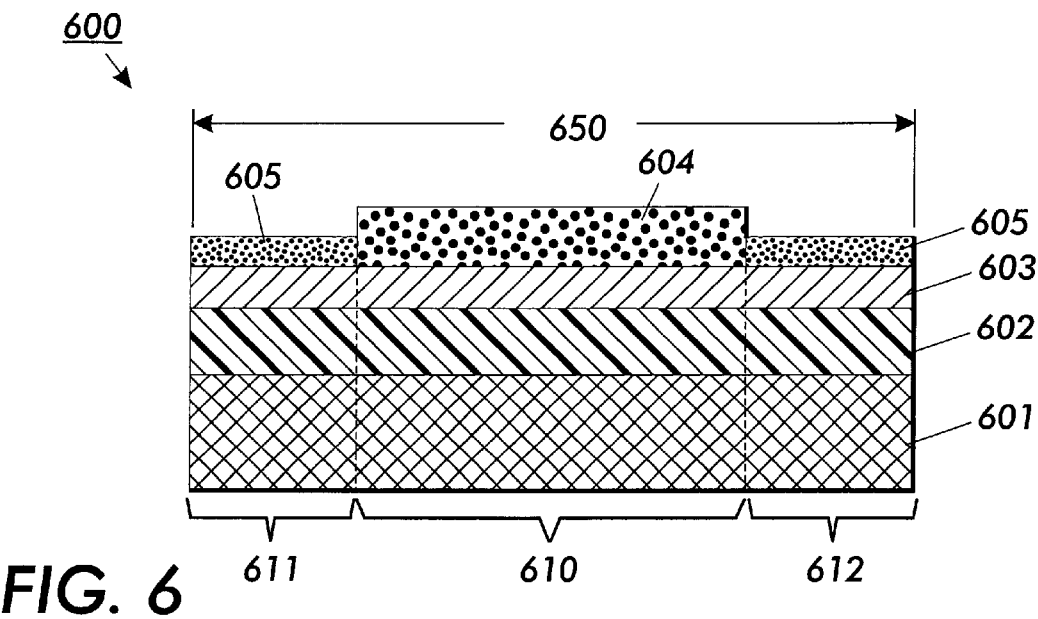
FIG. 6 is an end cross-section view of a further embodiment of a microwave bookbinder tape, in accordance with the present invention.

FIG. 6 is an end cross-section view of a further embodiment of a microwave bookbinder tape, in accordance with the present invention.

Figure 7:
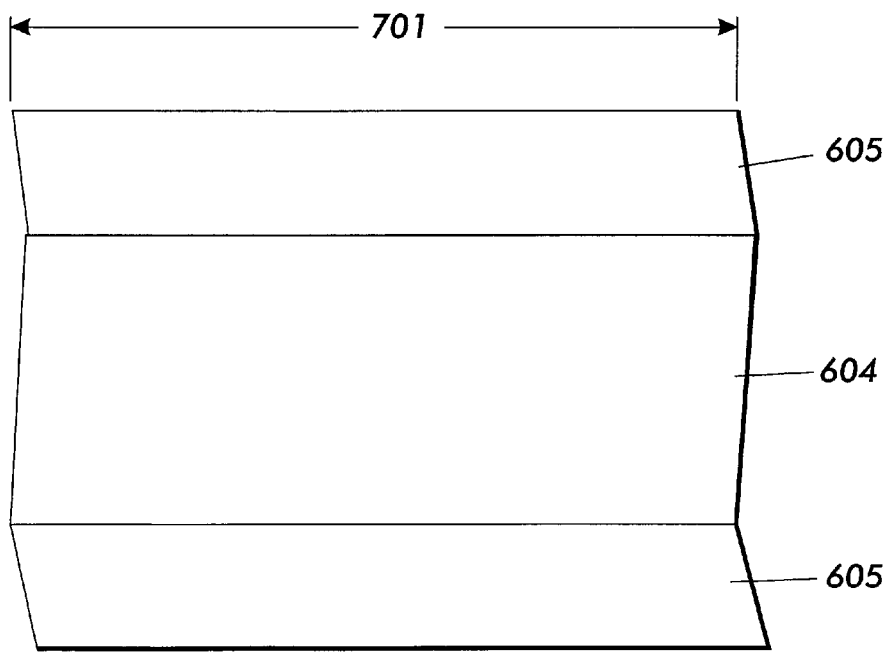
FIG. 7 is a top view of the FIG. 6 binder tape.

FIG. 7 is a top view of the FIG. 6 binder tape.

Referring generally to FIGS. 6–7, the bookbinder tape 600 comprises a backing substrate 601, which may comprise a latex saturated paper, plastic film or textile. In one embodiment, the backing substrate 601 is about 0.006 inches thick. The backing substrate 601 imparts strength and flexibility to the tape required for extensive handling. To obtain an acceptable bind, the substrate 601 must be pliable enough to conform to the edge of the book during the binding process.

As shown, a thin polyester film 602 is disposed on the backing substrate 601. In one embodiment, the polyester film 602 is laminated to the backing substrate 601, with a thickness of 0.005 to 0.001 inches.

Still referring to FIGS. 6–7, a dielectric coating of aluminum 603 is disposed on the polyester film 602. In one embodiment, the coating of aluminum 603 is formed by vaporizing aluminum on the surface of polyester film 602.

As shown in FIG. 6, a relatively thick stripe of a first water-soluble adhesive material 604 is disposed on the aluminum layer 603. The first adhesive stripe 604 is substantially congruent with a center portion 610 of the backing substrate 601, and extends longitudinally 701 on said backing substrate 601.

As shown, the first adhesive stripe 604 has a width 610 less than the width 650 of the backing substrate 601. As a result, the first adhesive stripe 604 defines side portions 611 and 612 of the backing substrate 601, which side portions 611 and 612 extend longitudinally 701 along either side of the first adhesive stripe 604.

Also as shown in FIG. 6, two (2) relatively thin stripes 605 of a second water-soluble adhesive are disposed upon the aluminum layer 603. These second adhesive stripes 605 extend substantially congruent with the side portions 611 and 612 discussed above, and extend longitudinally 701 on said backing substrate 601 parallel to the first adhesive stripe 604.

It will be appreciated that the first adhesive stripe 604 comprises adhesive for the book spine, whereas the second adhesive stripes 605 comprise adhesive for the book flaps.

In one embodiment, the first adhesive stripe 604 comprises the above adhesive UNIREZ2616 available from Arizona Chemical, and the second adhesive stripes 605 comprise the above adhesive Flexback 341077 available from National Starch.

In one embodiment, the thickness of the first adhesive stripe 604 and the second adhesive stripes 605 is controlled by extruding them directly onto the laminated composite consisting of the substrate 601, polyester film 602, and aluminum 603.

The binder tape 600 may be provided to the end user in the form of individual strips or reels.

In practice, during the bookbinding process, the aluminum dielectric layer 603, which layer 603 has a small thermal mass, converts microwave energy to heat. Heat generated adjacent to the solid adhesive stripes 604–605 causes the adhesive material to melt and penetrate into the surface of cover and page edges of the book to be bound. The quality of binding depends upon the properties of the adhesive stripes 604–605, efficiency of the application of heat, and the mechanical binding equipment used. Generally, the lower the viscosity of the adhesive stripes 604–605 achieved during the heating process, the better the adhesive materials will penetrate into the book cover and page edges, thus producing a strong bind.

See, generally, the above-referenced U.S. Pat. No. 4,267,420 to William A. Brastad, which patent discloses wrapping an item to be heated in a microwave oven 10 with a plastic film of polyester 26, the plastic film 26 including a very thin coating 28 of aluminum being disposed thereon by process of evaporation.

Referring again to FIGS. 6–7, thus there has been disclosed a microwave energy-activated binding tape 600 for use in binding pages together to form a book, the binding tape 600 comprising a backing substrate 601; a polyester film layer 602 disposed on the backing substrate 601; an aluminum layer 603 disposed on the polyester film layer 602; and an adhesive layer 604–605 disposed on the aluminum layer.

Moreover, as discussed above, in one embodiment the adhesive layer 604–605 comprises:

a stripe of a first adhesive 604 disposed on the aluminum layer 603 thus forming a first adhesive stripe 604, the first adhesive stripe 604 extending longitudinally 701 on said backing substrate 601 substantially congruent with a center portion 610 thereof, the first adhesive stripe 604 having a width 610 that is less than the width 650 of the backing substrate 601, the first adhesive stripe 604 thus defining two side portions 611 and 612 of the backing substrate 601 which extend longitudinally 701 along and adjacent to each side of the first adhesive stripe 604; and two stripes of a second adhesive 605 disposed on the aluminum layer 603 thus forming two second adhesive stripes 605, the two second adhesive stripes 605 being substantially congruent with the two side portions 611 and 612 of the backing substrate 601 and extending longitudinally 701 on said backing substrate 601 substantially parallel and adjacent to the first adhesive stripe 604.

Some advantages of the present invention are now discussed:

First, the levels of energy consumption required to melt the binding tape adhesive material is reduced.

Second, the binding time required to melt the tape adhesive and then cool to form a bind is reduced.

Third, the resulting microwave heat-generating process is more efficient, thus reducing the binding temperature presented to the book surface. As a result of this temperature reduction, the adverse temperature effects of discoloring or scorching the book page edges or flaps is also reduced.

While various embodiments of a microwave bookbinder tape, in accordance with the present invention, have been described hereinabove, the scope of the invention is defined by the following claims.

What is claimed is:

1. A microwave energy activated binding tape for use in binding pages together to form a book, comprising in combination:

a) a backing strip, said backing strip being composed of paper;

b) a microwave energy activatable first stripe of water soluble adhesive on said tape, said microwave energy activatable first stripe extending longitudinally of said backing strip substantially along the center thereof, said microwave energy activatable first stripe having a width less than the width of said backing strip whereby two side portions of said backing strip extend along each side of said microwave energy activatable first stripe; and c) a microwave energy activatable second stripe of said water soluble adhesive and a microwave energy activatable third stripe of said water soluble adhesive on each of said two side portions of said backing strip, wherein said water soluble adhesive includes aluminized particles therein.

2. A microwave energy activated binding tape for use in binding pages together to form a book, comprising:

a) a backing strip, said backing strip being composed of paper;

b) a microwave energy activatable first stripe of hot-melt glue on said tape, said microwave energy activatable first stripe extending longitudinally of said backing strip substantially along the center thereof, said microwave energy activatable first stripe having a width less than the width of said backing strip whereby two side portions of said backing strip extend along each side of said microwave energy activatable first stripe; and c) a microwave energy activatable second stripe of said hot-melt glue on one of said side portions of said backing strip;

d) a microwave energy activatable third stripe of said hot-melt glue on the other of said side portions of said backing strip;

wherein said microwave energy activatable first, second and third stripes of hot-melt glue include aluminum particles dispersed therein for increased heat conduction.

* * * * *